United States Patent [19]

Kühnel et al.

[11] 4,255,372

[45] Mar. 10, 1981

[54] PROCESS FOR THE PRODUCTION OF FOAM MATERIALS ON POLYOLEFIN BASIS

[75] Inventors: Werner Kühnel, Neunkirchen-Schoneshof; Paul Spielau, Troisdorf-Eschmar, both of Fed. Rep. of Germany

[73] Assignee: Dynamit Nobel Aktiengesellschaft, Fed. Rep. of Germany

[21] Appl. No.: 88,524

[22] Filed: Oct. 26, 1979

[30] Foreign Application Priority Data

Oct. 26, 1978 [DE] Fed. Rep. of Germany ....... 2846620

[51] Int. Cl.$^3$ ............................ B29H 7/20; C08J 9/22
[52] U.S. Cl. ........................................ 264/54; 260/2.3; 260/4 R; 260/4AR; 260/5; 260/724; 264/140; 264/DIG. 7; 264/DIG. 18; 264/DIG. 69; 521/54; 521/57; 521/134; 521/139; 521/140; 521/143; 521/144; 521/149; 525/194; 525/197; 525/198; 525/227; 525/232; 525/240; 525/241
[58] Field of Search ................. 264/54, 140, DIG. 7, 264/DIG. 18, DIG. 69; 521/54, 134, 139, 140

[56] References Cited

U.S. PATENT DOCUMENTS

| | | |
|---|---|---|
| 3,098,832 | 7/1963 | Pooley et al. ............... 264/DIG. 18 |
| 3,655,542 | 4/1972 | Tamai et al. ................ 264/DIG. 18 |
| 3,812,225 | 5/1974 | Hosoda et al. ............. 264/DIG. 18 |
| 3,823,213 | 7/1974 | Stastuy et al. .............. 264/DIG. 18 |

*Primary Examiner*—Morton Foelak

*Attorney, Agent, or Firm*—Craig and Antonelli

[57] ABSTRACT

A process for the production of polyolefin foam materials from crosslinked polyolefin foam scraps includes the steps of comminuting scraps of crosslinked polyolefin-containing foam; admixing the comminuted scraps with a synthetic resin on a polyolefin basis; compressing the resulting admixture at a temperature lying below the decomposition temperature of the crosslinking agent to form an aggregate product; comminuting this product to form a particulate material; plasticizing the particulate material at a temperature lying below the decomposition temperature of the crosslinking agent to form a shaped article; and crosslinking and expanding, i.e. foaming, the shaped article by heating the article to above the decomposition temperatures of the crosslinking agent and of the blowing agent. The foam scraps are obtained from a foam article produced by mixing a polyolefin or a blend of a polyolefin with an elastomer and/or synthetic resins with an organic peroxide crosslinking agent and a particulate blowing agent, the decomposition temperature of the crosslinking agent being below the decomposition temperature of the blowing agent, and optionally with customary additives; by forming the mixture, at a temperature lying below the decomposition temperatures of the crosslinking agent and the blowing agent, into a shaped article; and by subsequently crosslinking and expanding, i.e. foaming, this shaped article with the application of heat to above the decomposition temperatures of the crosslinking agent and the blowing agent.

4 Claims, No Drawings

PROCESS FOR THE PRODUCTION OF FOAM MATERIALS ON POLYOLEFIN BASIS

The invention relates to an improvement in a process for the production of foam materials having a polyolefin base by mixing a polyolefin or a blend of a polyolefin with an elastomer and/or a synthetic resin with an organic peroxide as the crosslinking agent and a blowing agent, the decomposition temperature of the crosslinking agent being below the decomposition temperature of the blowing agent, and optionally with customary additives; by forming of the resultant mixture, at a temperature lying below the decomposition temperatures of the crosslinking agent and the blowing agent, into a shaped article; and by subsequent heating of the shaped article to above the decomposition temperature of the crosslinking agent and the blowing agent to effect crosslinking and expansion thereof wherein crosslinked polyolefin foam scraps produced according to the heretofore described process are comminuted and compressed at a temperature lying below the decomposition temperature of the crosslinking agent, preferably at between 100° C. and 140° C.; the product, insofar as it is not obtained in comminuted form, is comminuted, and a shaped article is formed therefrom under plasticizing at a temperature lying below the decomposition temperature of the crosslinking agent; and this shaped article is crosslinked and expanded by heating to above the decomposition temperatures of the crosslinking agent and of the blowing agent, in accordance with German patent application No. P 28 11 642.9-43 and corresponding U.S. application Ser. No. 020,722, filed Mar. 15, 1979.

In the process according to German application No. P 28 11 642.9-43, the foam scraps are processed either by themselves, optionally with the addition of further, small amounts of crosslinking agent and blowing agent, into new foam material, or the foam strips are processed proportionately together with a complete mixture of raw materials into a new foam material.

It is possible by the process of the German application and of this invention to reprocess already crosslinked foam material, as present in abundance in the form of scrap, into a homogeneous foamed article. A "homogeneous foamed article" is understood to mean a foamed article which again exhibits closed cells of uniform structure. A surprising result of the invention, at the same time, that it is possible to reprocess the compressed, i.e. compacted foam scraps, to an expanded and crosslinked component even without the further addition of crosslinking agent and blowing agent. The bulk density of the shaped article produced from the foam scraps, though, is increased over that of the original foam material. One explanation for the invention could be seen in that there are residues of blowing agent and residues of crosslinking agent in the foam scraps stemming from the original manufacturing process, which agents have not as yet been decomposed and are activated during the renewed expanding and crosslinking process.

It has now been found surprisingly that the foam materials producible according to the German application by reprocessing of foam scraps alone can be further improved in their quality and homogeneity by compressing, according to the proposal of this invention, the comminuted foam scraps together with a synthetic resin on a polyolefin basis. In this connection, the expression "synthetic resins on a polyolefin basis" is understood to mean those polyolefin-containing resins which are also utilized in the production of the crosslinked foam materials. The synthetic resin is used herein in a comminuted form, preferably in the form of granules, optionally also in powder form. Compression is accomplished, as also described in German application No. P 28 11 642.9-43 by thorough mixing either in mixers, on rolls, or in extruders, to obtain a maximally homogeneous product. The addition of a synthetic resin has the further advantage that the temperatures during compression can be increased beyond the temperature ranges of preferably 100°–140° C. indicated in the German application, and homogeneous compounding and also compression are promoted. Temperature increases up to 160° C. have not had a deleterious effect on the foam quality. Insofar as the compressed mixture of foam scraps and synthetic resin is not obtained in comminuted form, it will be subsequently comminuted, for example granulated. This comminuted and compressed foam scrap-synthetic resin mixture, which is hereinafter called "compressed foam scrap", can be further processed into new foam material by following the procedures set forth in the German patent application.

However, a further processing into new foam material is preferred according to which the comminuted and compressed foam scraps are formed, together with an optionally compounded raw material mixture for the production of a crosslinked polyolefin foam material, this mixture having a proportion by weight of synthetic resin reduced by the weight proportion of the compressed foam scraps, into a shaped article under plasticization, at a temperature lying below the decomposition temperature of the crosslinking agent; and this shaped article is then crosslinked and foamed by heating.

In spite of the incorporation and reuse of not inconsiderable proportions of foam scraps, a homogeneous and uniform foam material, preferably in endless sheets, is obtained according to the proposed method. However, this means that the process of this invention makes it possible to economically recycle considerable amounts of scrap into new, more valuable products.

It has proven to be advantageous to add up to about 100 parts by weight of polyolefin, i.e. synthetic resin, per 100 parts by weight of foam scraps, and to compress, homogenize, and compound the foam scraps therewith. In the production of new foam material from compressed foam scraps and a raw material mixture, 5–70 parts by weight, preferably 10–40 parts by weight of compressed foam scraps are used per 100 parts by weight of total mixture. For a fresh batch for the manufacture of crosslinked polyolefin foam, the raw materials employed are, depending on the weight per unit volume to be attained, about 0.8–1.2 parts by weight of crosslinking agent, 0.5–25 parts by weight of blowing agent, and 73.8–98.7 parts by weight of polyolefin, and to this can be added customary additives, such as light-protection agents, pigments, fillers, chalk, flame retardants, etc. Depending on the proportion of blowing agent, foams are obtained having high or low weights per unit volume, ranging usually between 15 and 200 kg./m$^3$.

The polyolefin foam-forming material utilized for the invention is produced according to conventional methods. The term "polyolefins" is understood to mean: high-pressure or low-pressure polyethylene, copolymers consisting essentially of ethylene, i.e. at least 70% by weight, as well as mixtures thereof. Such mixed copolymers are, for example, ethylene-propylene copolymers, ethylenebutylene copolymers, copolymers of ethylene and vinyl acetate and the derivatives thereof, copolymers of ethylene and acrylic acid esters or the derivatives thereof, copolymers of ethylene and methacrylic acid esters or the deravatives thereof, or the like. Also mixtures of the above-mentioned polyolefins with elastomers and/or synthetic resins can be processed into fine-pored foams by this invention. These are understood to be mixtures, for example, which contain up to 100% by weight of the polyolefin. Elastomers miscible with polyolefin are, for example, natural rubber, ethylene-propylene elastomer, butyl elastomer, polyisobutylene, styrene-butadiene elastomer, polybutadiene, polybutene, and polyisoprene. Synthetic resins miscible with polyolefin are, for example, polystyrene, polypropylene, chlorinated polyethylene, sulfochlorinated polyethylene, or the like. In general the mixture contains at least 50% of the polyolefin.

Preferably employed polyolefins are polyethylenes, low-pressure and high-pressure polyethylene, depending on the mixture composition, but preferably high-pressure polyethylene having a density of 0.91-0.94 g./cc.

Suitable organic peroxides are, depending on the composition of the polyolefin, 2,5-dimethyl-2,5-di(tert. Butyl-peroxy) hexane, ter.-butyl hydroperoxide, cumyl tert.-butyl peroxide, di-tert.- butyl peroxide, preferably dicumyl peroxide. The peroxides are used in amounts of about 1%. The decomposition temperature of dicumyl peroxide is about 170° C., at which point crosslinking commences.

The preferably employed blowing agent, azodicarbonamide, has a decomposition temperature above 190° C., which is higher than that of the crosslinking agent. The concentration of the blowing agent is dependent on the bulk density of the product to be expanded and ranges between 0.5 and 25% by weight, based on the total mixture, preferably 1-15% by weight of the mixture to be formed into a shaped article; in this case, foams are obtained having a bulk density of 20 kg./m$^3$ to 300 kg./m$^3$, depending on the batch.

Customary additives ordinarily employed together with synthetic resins on polyolefin basis are, for example, light-protection agents, pigments, filler, e.g. chalk, flame retardants, antistats, mold release agents, or the like, which can be added to the mixture to be crosslinked and expanded before thermoplastic processing into a panel.

Foam scraps having a very high bulk density can show a strong tendency toward tackiness during compacting and plasticizing to obtain the shaped article. According to the invention, the provision is made to add to the foam scraps additionally crosslinking agents up to about 1 part by weight, based on 100 parts by weight of foam scraps. In the same way, it is also possible in case of foam scraps, especially those having a high bulk density, to add additional blowing agents, preferably azodicarbomide, up to about 15 parts by weight, based on 100 parts by weight of foam scraps. The higher the bulk density of the foam scraps utilized, the more blowing agent can be added.

The preparing and compressing of the crosslinked polyolefin foam particles of granules, etc. for reprocessing can be effected according to several methods. A preferred mode of operation provides that the comminuted foam scrap is compressed by intensive mixing at an elevated temperature, so that the air is forced out and a substantially higher bulk density is obtained. However, it is also possible to compress the foam scrap, for example, by extrusion and then comminute the product again (granulation).

This invention provides a process for reprocessing crosslinked closed-cell polyolefin foam scraps only with the polyolefin into new foamed articles. In a further development of the invention described in the German application No. P 28 11 642.9, the provision is made to process the foam scrap together with a mixture of raw materials, i.e. polyolefin, crosslinking agent, blowing agent and other additives, for the manufacture of crosslinked polyolefin foams in combination to obtain new foamed articles. This is done according to this application by mixing the compressed and comminuted foam scrap with the raw materials for the production of a crosslinked polyolefin foam material; optionally compounding and comminuting the mixture at a temperature below the decomposition temperature of the crosslinking agent; and forming therefrom a shaped article under plasticization at a temperature lying below the decomposition temperature of the crosslinking agent; and then crosslinking and expanding this article by heating. Due to these process steps, it is made possible to process already crosslinked foam material with a non-crosslinked raw material mixture together into a new, crosslinked homogeneous foam material, wherein the total mixture is crosslinked and expanded. Since the large volume of the foam scrap is reduced by a compression step conducted at a temperature below the decomposition temperature of the crosslinking agent, the foam particles can be more readily processed in a larger volume with the fresh batch of the foam material. However, it has been found that the presence of the additional crosslinking agent and blowing agent in the raw material may cause difficulties with the mixing and compressing temperature becoming too high, e.g. becoming higher than 150° C.

Advantageously it has been found that the process of the present invention overcomes these difficulties in that the foam scrap is initially only admixed with the synthetic resin having a polyolefin basis and as a result the temperature during the initial compression of the scraps and the synthetic resin can be increased to a temperature of 160°.

In the incorporation of compressed foam scraps into a raw material mixture of a fresh batch, the proportion of a crosslinking agent and blowing agent in the raw material mixture can be retained analogously to a foam produced only of a fresh batch, at a predetermined weight per unit volume to be attained for the foam material to be produced, if the synthetic resin proportion for the fresh batch is reduced by the proportion of compressed foam scraps added.

The working up and compressing of the crosslinked foam particles together with the synthetic resin can be accomplished in the same manner as heretofore described with reference to the foam scraps alone. The mixture of raw materials can be used in individual components and/or as a batch.

The crosslinked polyolefin foam scrap useful for purposes of this invention as produced, for example, as edge cuttings, may have a bulk density, customarily ranging in case of polyolefin foam materials between 15 and 200 kg./m$^3$. The foam scraps are still further comminuted by means of a cutting mill, even though the scraps are already present in piece form. For this purpose, cutting mills are used, for example, with screens of 1-20 mm. The compacting of the comminuted foam scraps can take place, for instance, by thorough mixing at an elevated temperature in a mixer or be means of rolling or a rolling mill or by extrusion by means of a screw extruder. In this connection, it is an important factor for conducting the process of this invention that the bulk temperature of the foam scrap during compression be lower than the decomposition temperature of the crosslinking agent employed. If the crosslinked foam scrap is ground up, for example, in a hot mixer and the foam particles are compressed during this step, then, as discharge, compacted chips are obtained in the form of an agglomerate. While passing through an extruder, the compressed skein is once more comminuted at the outlet.

The preparation and compression of the crosslinked polyolefin foam particles for reuse in the production of chemically crosslinked polyolefin foam materials can be accomplished according to several processes:

(A) Preparation by rolling on a rolling mill:

The crosslinked polyolefin foam chips are compacted on a rolling mill at a roll surface temperature of 110° C. and a speed of 17 r.p.m.

(B) Preparation by mixing in a hot mixer:

Roughly comminuted polyolefin foam chips are introduced into a fluid mixer and thoroughly mixed up to a temperature of 150° C. so that the chips are compressed, the air is forced out, and a substantially higher bulk density is obtained than in case of chips which have not been prepared.

(C) Preparation by extrusion:

Larger pieces of scrap, such as edge cuttings or punched-out residues of crosslinked polyolefin foam and/or comminuted polyolefin foam chips are processed by way of a continuously compressing machine, e.g. a twin-screw extruder. Here again, the operating temperature while the mixture passes through the extruder must lie below the decomposition temperature of the peroxide.

The mixture of the synthetic resin and compressed, crosslinked polyolefin foam particles can optionally also be compounded by means of the three processing steps listed under (A), (B), and (C), and can subsequently be granulated.

The invention will be explained hereinbelow with reference to the following examples.

EXAMPLE 1

15 parts by weight of crosslinked polyolefin foam chips having a bulk density of 30 kg./m$^3$, produced from 84.1 parts by weight of high-pressure polyethylene with a melt index of 4 g./10 min. and 0.9 part by weight of dicumyl peroxide, *) is introduced together with 15 parts by weight of high-pressure polyethylene in granulated form having a melt index of 4 g./10 min. into a fluid mixer and mixed until the friction-caused heat rises to 100° C., the foam chips thus being subjected to a preliminary compression. The thus-obtained product is then homogenized and granulated by means of an extruder at about 140° C. under plasticization of the high-pressure polyethylene. The thus-produced 30 parts by weight of compressed foam chips is mixed with a fresh batch in granulated form for a crosslinked polyolefin foam material having a bulk density of 30 kg./m$^3$, the proportion of high-pressure polyethylene of which, amounting to 84.1 parts by weight, has been reduced, by the 30 parts by weight of added compressed foam chips, to 54.1 parts by weight; this fresh batch furthermore contains 0.9 part by weight of dicumyl peroxide and 15 parts by weight of azodicarbonamide. These components are plasticized together in an extruder at a temperature of about 140° C. lying below the decomposition temperature of the crosslinking agent, and then the thus-produced shaped article, for example a panel, is crosslinked and expanded at a temperature of 210° C. The final product, namely a crosslinked polyolefin foam panel, has, with a homogeneous structure, a bulk density of 29 kg./m$^3$.

*) and is parts by weight of azodicarbonamide

EXAMPLE 2

15 parts by weight of crosslinked polyolefin foam chips having a bulk density of 30 kg./m$^3$, prepared from 84.2 parts by weight of ethylene-vinyl acetate copolymers and 0.8 part by weight of dicumyl peroxide and 15 parts by weight of azodicarbonamide, is compressed and compounded with 15 parts by weight of ethylene-vinyl acetate copolymers in granulated form on a rolling mill with a roll surface temperature of 120° C. at a speed of 18 r.p.m. The thus-produced rolled sheet is then comminuted. The resultant 30 parts by weight of rather small, compressed foam scraps is plasticized by way of a rolling mill at a temperature of 120° C. with a raw material mixture, the synthetic resin proportion of which, however, is reduced only by one-half, namely 15 parts by weight, of the weight proportion of the compressed foam chips to 69.2 parts by weight of ethylenevinyl acetate copolymers, this mixture containing 0.8 part by weight of dicymyl peroxide and 15 parts by weight of azodicarbonamide. The mixture is pressed into a panel which is subsequently crosslinked and foamed in a drying chamber at a temperature of 210° C. The thus-obtained foam panel has a bulk density of 37 kg./m$^3$.

EXAMPLE 3

20 parts by weight of crosslinked polyolefin foam chips having a bulk density of 30 kg./m$^3$ as in Example 1 is compressed with 20 parts by weight of high-pressure polyethylene having a melt index of 4 g./10 min. continuously in a twin-screw extruder at a temperature of about 140° C. and is granulated upon exiting from the extruder. The thus-obtained 40 parts by weight of granules is processed into a foam panel as described in Example 2 with a fresh batch for a crosslinked polyolefin foam material having a bulk density of 115 kg./m$^3$, wherein the 95 parts by weight of high-pressure polyethylene is reduced by the added 40 parts by weight of compressed foam chips, this batch containing 1 part by weight of dicymyl peroxide as well as 4 parts by weight of azodicarbonamide. The thus-produced foam panel has a bulk density of 105 kg./m$^3$.

What is claimed is:

1. A process for the production of polyolefin foam materials from crosslinked polyolefin foam scraps which comprises mixing a polyolefin or a blend of a polyolefin with an elastomer and/or synthetic resins with an organic peroxide as the crosslinking agent and a blowing agent, the decomposition temperature of the crosslinking agent being below the decomposition temperature of the blowing agent, and optionally with customary additives; forming the mixture, at a temperature lying below the decomposition temperatures of the crosslinking agent and the blowing agent, into a first shaped article; subsequently crosslinking and expanding the first shaped article by heating to above the decomposition temperatures of the crosslinking agent and the blowing agent; obtaining scraps of said crosslinked polyolefin-containing foam material comminuting the crosslinked polyolefin-containing foam scraps; thereafter admixing the comminuted scraps with a synthetic resin on a polyolefin basis, and then compressing the admixture at a temperature lying below the decomposition temperature of the crosslinking agent to form an aggregate product; comminuting this product to form a particulate material; plasticizing this material at a temperature lying below the decomposition temperature of the crosslinking agent to form a second shaped article; and crosslinking and expanding the second shaped article by heating to above the decomposition temperatures of the crosslinking agent and of the blowing agent.

2. A process according to claim 1, characterized in that up to about 100 parts by weight of the synthetic resin on a polyolefin basis is added per 100 parts by weight of foam scraps.

3. A process according to claim 1 or 2, characterized in that the comminuted and compressed foam scraps are formed into a shaped article under plasticization at a temperature lying below the decomposition temperature of the crosslinking agent, together with an optionally compounded raw material mixture for the production of a crosslinked polyolefin foam material, this mixture having a weight proportion of synthetic resin reduced by the weight proportion of the compressed foam scraps; and that this shaped article is then crosslinked and expanded by heating.

4. A process according to claim 3, characterized in that, of 100 parts by weight of total mixture, 10-70 parts by weight is constituted by foam scraps compressed together with the synthetic resin.

* * * * *